May 10, 1955      A. B. SOWTER      2,707,822

METHOD FOR COLD PRESSURE WELDING

Filed Jan. 14, 1950      2 Sheets-Sheet 1

INVENTOR
ANTHONY BAGNOLD SOWTER

BY    *[signature]*

ATTORNEY

May 10, 1955  A. B. SOWTER  2,707,822
METHOD FOR COLD PRESSURE WELDING
Filed Jan. 14, 1950  2 Sheets-Sheet 2

INVENTOR
ANTHONY BAGNOLD SOWTER

BY

ATTORNEY

United States Patent Office 2,707,822
Patented May 10, 1955

2,707,822

METHOD FOR COLD PRESSURE WELDING

Anthony Bagnold Sowter, Wembley, England, assignor to The General Electric Company Limited, London, England Application January 14, 1950, Serial No. 138,535

Claims priority, application Great Britain March 18, 1949

2 Claims. (Cl. 29—470.1)

This application is a continuation-in-part of application Serial No. 123,315, filed October 25, 1949, entitled Cold Pressure Welding, now Patent No. 2,522,408, issued September 12, 1950.

The present invention relates to cold pressure welding, more particularly to a method of and means for connecting relatively narrow or elongated work pieces, such wires or the like, by one or more cold weld joints, substantially without the application of external heat.

In welding together work pieces of aluminum, copper and other metals or alloys capable of being cold pressure welded, where a rectangular weld of a predetermined length and a predetermined percentage reduction in total thickness of the pieces being welded together is required, it is known to use a tool or a pair of cooperating tools whose pressure face or faces is or are of substantially flat rectangular shape. Thus, with a shouldered tool or die as shown and described in the above patent, a pressure tip extending from the flat end surface or shoulder of the tool tapers to its operative face which is flat and rectangular in shape.

Where tools of this form are used for welding together the flattened ends of aluminum wires or other relatively narrow or elongated work pieces, the work pieces being laid one upon the other, the rectangular or strip-like shape of the face of the pressure tip has been found not to be wholly satisfactory, since, if the length of the tip runs along the line of the wires or other elongated work pieces, there will be an abrupt change in flow of the metal at the ends of the weld by the pressure application during the welding operation. Accordingly, where the width of the weld is very little less than the width of the flattened wire ends or other pieces being welded together, this may lead to mechanical weakness of the cold weld joint obtained.

Accordingly, an object of the present invention is to substantially overcome the above-mentioned difficulty.

A more specific object of the invention is to prevent an abrupt change of flow of metal at the ends of a rectangular or strip-like cold weld during the welding operation.

A further object is the provision of an improved tool for and a method of cold welding together the ends of relatively narrow or elongated work pieces by one or more strip-like or rectangular shaped cold welds, substantially without weakening the mechanical joint at the short ends of the welding area.

A more specific object is the provision of means for joining together the ends of a pair of wires by cold pressure welding.

Still another object is to provide a suitably shaped tool for cold welding together the ends of relatively narrow work pieces of metal capable of being cold pressure welded.

A further object is the provision of a simple composite tool for flattening the ends of a pair of wires capable of being cold pressure welded and subsequently joining the flattened ends by cold pressure welding.

The above and further objects as well as novel aspects of the invention will become more apparent from the following detailed description taken in connection with the accompanying drawings, forming part of this specification and in which.

Like reference numerals identify like parts throughout the different views of the drawings.

With the above objects in view, the invention involves generally the provision of a welding tool or die having a pressure tip with a rectangular or strip-like and substantially flat operative face shaped to taper at both ends. The face of said tip may taper away smoothly to points at its ends or alternatively, it may taper by one or more steps in its width and, besides tapering in width, the tip may be slightly radiused at its ends so as to decrease in operative or welding height towards its ends. In other words, the pressure tip may be shaped or profiled like a flat-bottomed boat, as shown and described in greater detail hereafter.

Figure 1:
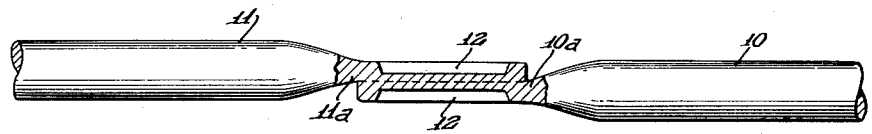
Figure 1 is a side view, on an enlarged scale and partly shown in cross-section, of a pair of wires joined together by cold pressure welding in accordance with the invention.
Figure 2:
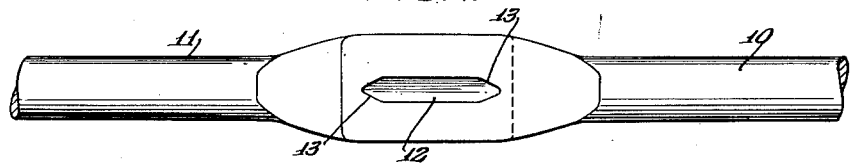
Figure 2 is a top view of the cold weld joint shown in Figure 1.
Figure 3:
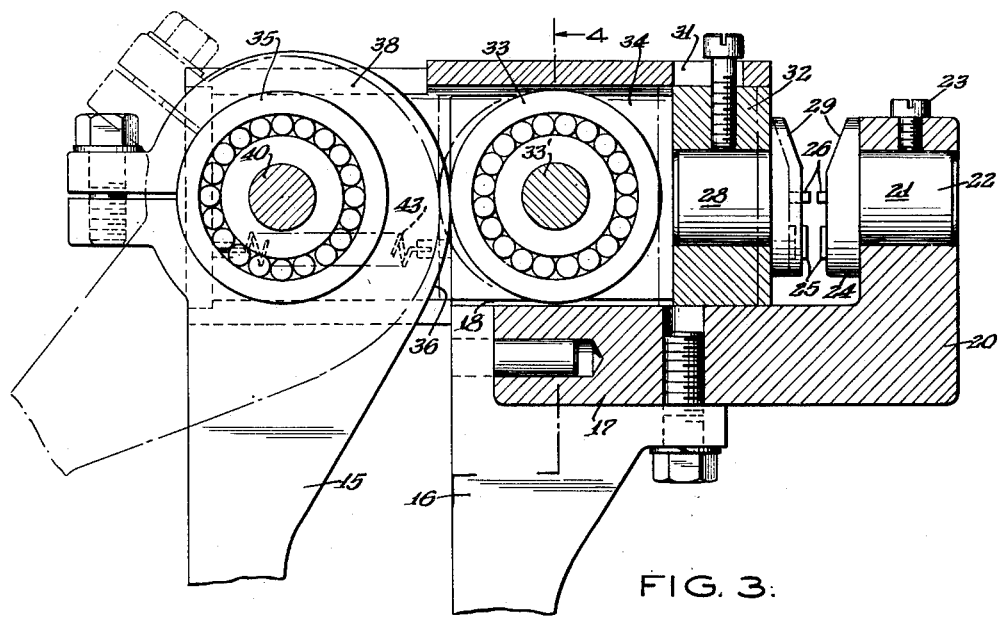
Figure 3 is a side view, partly shown in cross-section, of a composite wire flattening and cold welding device constructed in accordance with the principles of the invention.
Figure 4:
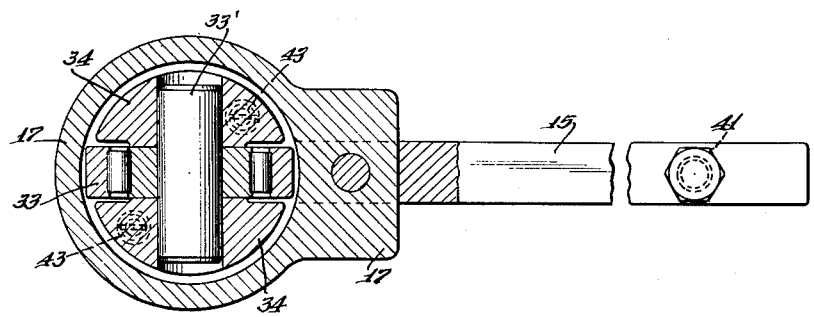
Figure 4 is a sectional view taken on line 4—4 of Figure 3.

Referring more particularly to Figures 1 and 2, the numerals 10 and 11 represent a pair of wires of aluminum, copper or other suitable metals or metal alloys capable of being cold pressure welded, said wires having flattened end portions 10a and 11a, respectively, placed one on the other and connected by a cold weld joint in accordance with the invention. For this purpose, a specially designed welding tool or die is used having a rectangular or strip-like operative or contact face with tapering end surfaces, to result in a correspondingly shaped weld or indentation 12 having tapering end portions or areas 13, as shown in Figure 2. Consequently, an abrupt change in the metal flow conditions as a result of the pressure application during the cold welding operation is avoided at the short ends of the welding area, in such a manner as to result in a cold weld joint of increased mechanical strength and resistance to bending and other stresses.

Referring to Figures 3 to 6, there is shown a composite wire flattening and cold welding device for producing a wire or similar joint of the type shown in Figures 1 and 2. The device shown comprises a pair of arms 15 and 16 pivoted together and arranged to be forced together both for flattening and welding the wires, tubes, or the like. Arm 16 which may be termed the fixed arm is attached to the main body 17 of the device which has a central bore 18, the axis of which is perpendicular to the length of the arm 16. The body 17 has an L-shaped projection 20 at the front end thereof to provide a mounting for a first tool piece 21 facing into the bore 18 of the body 17. The tool piece 21 has a stem portion 22 which fits into a through bore in the projection 20, being removably secured therein by a set screw 23, and a head portion 24 provided with a pair raised adjacent tool faces 25 and 26. The tool face 25 being set off the axis of the bore 18 in the body 17 is of flat rectangular shape and serves for flattening the wires or tubes preparatory to the cold welding operation, while the tool face or tip 26 being set on said axis is flat with straight sides tapering towards a point at each end (see Figure 6) and serves for welding together the flattened wires or other work pieces.

In other words, the tool face 26 is substantially hexagonal in shape and in order to achieve a sufficient and reliable cold weld connection, the width of the face 26 should be about equal or of the order of the thickness of the flattened wire portions, while the length of the face or tip 26 is a multiple equal to five times or more of said thickness.

Figure 7:
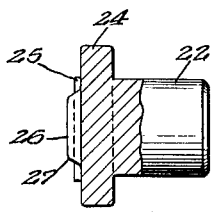
Figure 7 is a sectional view taken on line 7—7 of Figure 6.

If desired, the pointed ends of the cold pressure welding face or tip 26 may be curved rearwardly, that is towards the head 24 to a slight extent, whereby the height or profile of the tool face or tip will be shaped in the manner of a flat-bottomed boat, as shown more clearly at 27 in Figure 7 of the drawing.

Figure 6:
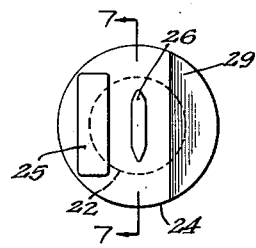
Figure 6 is a front view of one of the flattening and welding tool pieces embodied in the device shown in Figure 3.

The lengths of the two tool faces 25 and 26 are parallel to each other, as shown in Figure 6, and at right angles to the arm 11, while the head 24 of the tool piece 21 is cut away on the side away from the lower or horizontal part of the L-shaped projection 20 connected with the body 17, as shown at 29, to facilitate entry of the wires or other work pieces into the tool in carrying out the flattening and/or welding operations.

Tool piece 21 cooperates with a similar tool piece 28 removably mounted, by a set screw 30 or the like moving within a slot 31 in the body 17, in a member or tool carrier 32 sliding within the bore 18 of said body, the two tool pieces 21 and 28 being arranged to be forced together for effecting the flattening and welding operations. The member 32 carries a roller bearing 33 secured to a shaft 33' which is mounted between two arms or extensions 34 of said member (only one arm being visible in the drawing), the axis of the bearing 33 being perpendicular to the length of the arm 16 of the device and passing through the axis of the bore 18 in the body 17. Suitable means, such as a pair of compression springs 43 (see Figures 4 and 5) within the bore 18 serve to normally bias the two tool pieces 21 and 28 apart, pressure to force them together against the action of said springs being arranged to be applied by the movable arm 15 of the device to the outer surface of the roller bearing 33.

For this purpose, the movable arm 15 is clamped around or otherwise secured to the outer member of a second roller bearing 35 also arranged with its axis passing through the axis of the bore 18 of the body 17 and being perpendicular to the lengths of the two arms 15 and 16 which latter are in the same plane. A spiral shaped or cam face 36 on the upper part 38 of the movable arm 15 between the two bearings 33 and 35 engages the bearing 33 associated and moving with the tool piece 28. The inner part of the roller bearing 35 is fast on or secured to a shaft 40 mounted in the bore 18 of the body 17, the rear portion of the latter being slotted to receive the arm 15, as shown more clearly in Figure 4.

In operation, when the two arms 15 and 16 are separated as indicated in dot-dash lines in the drawing, there is a minimum radial thickness of part 38 of the arm 15 between the two bearings 33 and 35 and as the arms 15 and 16 are closed, as shown in full lines in the drawing, against a suitable stop 41 which controls both the degree of flattening and reduction in total thickness of the work pieces during welding, the radial thickness of the spiral or cam surface 36 increases, whereby the tool pieces 21 and 28 will be forced towards one another by causing member 32 to slide in the bore 18 by the action of cam 36. At the same time the springs 43 will be tensioned, to result in an automatic return of the tool piece 28 at the end of the welding operation upon release of the arm 15.

Figure 5:
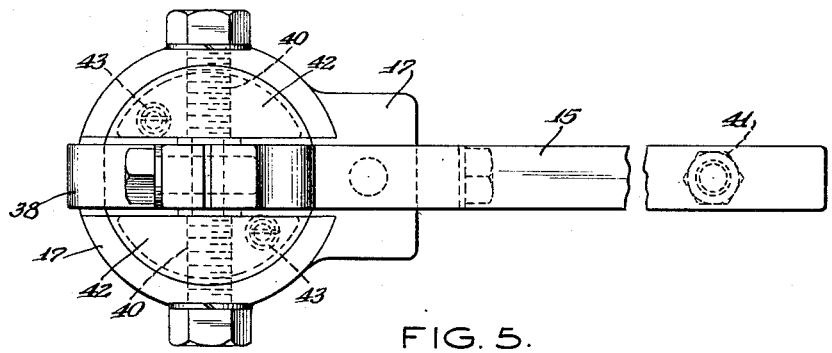
Figure 5 is a rear view of the device shown in Figure 3.

On each side of the bearing 35 in the bore 17 are mounted closure or filling pieces 42, Figure 5, and it is between these pieces 42 and the arms 34 of the member 32 that the springs 43 act to normally bias the member 32 away from the projection 20 of the body 17.

The spiral or cam face 36 of part 38 of the arm 15 provides a method of obtaining a varying mechanical advantage during the operation of the device. Thus, when flattening a tube, little force is necessary at the commencement of flattening and the cam or spiral shaped surface may be so designed as to take advantage of this fact. An increased mechanical advantage will be provided for welding.

In using a device of the above type for welding two wires together in line, the ends of the two wires are at first flattened between the rectangular faces 25 on the tool pieces 21 and 28. Subsequently, after cleaning the flattened surfaces to be welded together by scratch-brushing to remove any oxide coating or other surface contamination, the two flattened ends are placed one on the other between the tool faces 26 and pressure applied by closing the arms 15 and 16 of the device to effect the cold welding and to produce a joint or weld having a shape determined by the tool face 26 and a depth or percentage reduction determined by the stop 41. The movable arm 15 is then eased away from the arm 16 and the welded joint removed. As is understood, the relative height of the tool faces 25 and 26 are so chosen and the stop 41 so set to give a proper flattening of the wires and a weld of the required percentage reduction, as will be understood.

In the device described hereinabove, the two roller bearings 33 and 35 are forced apart by a moving arm or cam which, in effect, rotates a wedge between said bearings. Alternatively, the bearings may be forced apart by a wedge driven on a straight line, such as a wedge operated and driven between the bearings by pneumatic or hydraulic means. Such a device will be more suitable for stationary welding equipment for welding relatively heavy work pieces, while the construction shown is specially adapted for portable use and manual operation.

By replacing the tool pieces 21 and 28 by pieces having suitable cutting jaws, the device in either form may be used as a pair of cutters as will be understood.

A device of the type described above may be used for fabricating wire mesh of aluminum or other wire capable of cold pressure welding. The wire may be flattened before fabrication into the mesh or may be round and flattened just prior to welding and adjacent wires welded together at their over-lapping parts or intersections. Thus, a length of mesh could be built up of two side wires, a single length of wire which runs between said side wires being welded thereto at spaced points and having adjacent parts of itself welded together. The single length of wire may be bent into shape before welding to the side wires and itself.

While there has been disclosed and described a desirable embodiment of the invention, it will be evident from the foregoing that changes in the size, shape and arrangement of parts, as well as the substitution of equivalent elements for those disclosed herein, may be made without departing from the scope and spirit of the invention. Thus, while the particular type of cold weld and tool described herein is of special advantage in joining the flattened ends of a pair of wires free from previous difficulties, similar advantages will be obtained by producing cold weld joints of this type in connection with the cold welding of other work pieces, in particular elongated or relatively narrow pieces forming separate elements or a part of relatively larger members to be united by one or more weld joints. Furthermore, the tool described may be used for welding only if the work pieces to be joined are of a flat or strip-like shape, in which case the tool faces 25 may be omitted.

The specification and drawings are accordingly to be regarded in an illustrative rather than in a limiting sense.

I claim:

1. A method of joining a pair of rod-like members of cold pressure weldable material comprising flattening the end portions of the members to be joined, cleaning one face of the flattened end portions to provide uncontaminated metallic surfaces, superimposing the flattened end portions with the cleaned surfaces in contacting relation in the manner of a lap joint and with the members substantially in line with one another, and applying to an oblong rectangular area of the superposed end portions, being in line with said members and extending in both directions to points relatively close to the short edges thereof, a pressure in a direction substantially at right angle to the interface between said end portions, to effect such metal reduction as to create an intensive interfacial metal flow to weld said end portions by a solid phase welding bond at said area, the end surfaces of said area having a width tapering from a constant central width towards the opposite ends thereof.

2. In a method as claimed in claim 1, wherein the metal reduction at the end surfaces of said area decreases gradually in a direction towards said ends from a constant value at the center at said area.

References Cited in the file of this patent

UNITED STATES PATENTS

| Number | Name | Date |
|---|---|---|
| 601,473 | Lamb | Mar. 29, 1898 |
| 1,169,386 | Engel | Jan. 25, 1916 |
| 1,320,590 | Waters | Nov. 4, 1919 |
| 1,483,071 | Calder | Feb. 12, 1924 |
| 1,555,652 | Frame | Sept. 29, 1925 |
| 1,560,748 | Wilderson | Nov. 10, 1925 |
| 1,933,731 | Hanna | Nov. 7, 1933 |
| 2,327,920 | Moohl | Aug. 24, 1943 |
| 2,427,597 | Garner | Sept. 16, 1947 |
| 2,467,913 | Sanders | Apr. 19, 1949 |
| 2,522,408 | Sowter | Sept. 12, 1950 |

OTHER REFERENCES

Publication, Metal Industry, May 21, 1948.